US008572355B2

(12) United States Patent
Rozas et al.

(10) Patent No.: US 8,572,355 B2
(45) Date of Patent: Oct. 29, 2013

(54) SUPPORT FOR NON-LOCAL RETURNS IN PARALLEL THREAD SIMD ENGINE

(75) Inventors: Guillermo Juan Rozas, Los Gatos, CA (US); Brett W. Coon, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 506 days.

(21) Appl. No.: 12/881,065

(22) Filed: Sep. 13, 2010

(65) Prior Publication Data
US 2011/0078418 A1    Mar. 31, 2011

Related U.S. Application Data

(60) Provisional application No. 61/246,384, filed on Sep. 28, 2009.

(51) Int. Cl.
*G06F 9/30*    (2006.01)
(52) U.S. Cl.
USPC ............ 712/220; 712/22; 712/228; 712/235; 712/244
(58) Field of Classification Search
USPC .................. 712/220, 22, 228, 234, 235, 244
See application file for complete search history.

(56) References Cited

U.S. PATENT DOCUMENTS

| 5,555,428 | A * | 9/1996 | Radigan et al. ............ 712/22 |
| 5,784,613 | A * | 7/1998 | Tamirisa .................. 718/100 |
| 6,947,047 | B1 * | 9/2005 | Moy et al. ................. 345/501 |
| 7,353,369 | B1 * | 4/2008 | Coon et al. ............... 712/220 |
| 7,617,384 | B1 * | 11/2009 | Coon et al. ............... 712/220 |
| 7,761,697 | B1 * | 7/2010 | Coon et al. ............... 712/233 |
| 7,877,585 | B1 * | 1/2011 | Coon et al. ............... 712/234 |
| 8,312,254 | B2 * | 11/2012 | Coon et al. ............... 712/234 |
| 2004/0039902 | A1 * | 2/2004 | Parthasarathy ............. 712/244 |

OTHER PUBLICATIONS

Hirasawa et al., "Toward a Portable Programming Environment for Distributed High Performance Accelerators", Conference: Future Dependable Distributed Systems, 2009 Software Technologies for, Mar. 2009, pp. 189-194.*
Kernighan et al., "The C Programming Language", Mar. 1988, Prentice Hall, 2nd Ed., Section Appendix B8, 1 page.*

* cited by examiner

*Primary Examiner* — Andrew Caldwell
*Assistant Examiner* — Yuqing Xiao
(74) *Attorney, Agent, or Firm* — Patterson & Sheridan, L.L.P.

(57) ABSTRACT

One embodiment of the present invention sets forth a method for executing a non-local return instruction in a parallel thread processor. The method comprises the steps of receiving, within the thread group, a first long jump instruction and, in response, popping a first token from the execution stack. The method also comprises determining whether the first token is a first long jump token that was pushed onto the execution stack when a first push instruction associated with the first long jump instruction was executed, and when the first token is the first long jump token, jumping to the second instruction based on the address specified by the first long jump token, or, when the first token is not the first long jump token, disabling the active thread until the first long jump token is popped from the execution stack.

20 Claims, 6 Drawing Sheets

SUPPORT FOR NON-LOCAL RETURNS IN PARALLEL THREAD SIMD ENGINE

CROSS-REFERENCE TO RELATED APPLICATIONS

This application claims benefit of U.S. provisional patent application entitled "Support for Non-Local Returns (LONGJMP, EXCEPTION) in Parallel Thread SIMD Engine" having a Ser. No. 61/246,384 and filed on Sep. 28, 2009.

BACKGROUND OF THE INVENTION

1. Field of the Invention

The present invention relates generally to the field of parallel processing and, more specifically, to support for non-local returns in a parallel thread single-instruction-multiple-data engine.

2. Description of the Related Art

To increase performance, graphics processors typically implement processing techniques such as pipelining that attempt to process, in parallel, as much data as possible throughout the different parts of the pipeline. Parallel graphics processors with single instruction, multiple thread (SIMT) architectures are designed to maximize the amount of parallel processing in the graphics pipeline. In a SIMT architecture, groups of parallel threads attempt to execute program instructions synchronously together as often as possible to increase processing efficiency.

In typical SIMT architectures, there is no support for performing non-local returns. Non-local returns allow threads executing a sequence of instructions to jump to a different sequence of instructions. Such scenarios may occur during exception handling such as during a C++ try/catch/finally block. The lack of support for performing non-local returns reduces the functionality and flexibility available to the programmer when programming code sequences to be executed on a processor that implements a SIMT architecture.

Accordingly, what is needed in the art is a mechanism that allows non-local returns to be executed in a SIMT environment.

SUMMARY OF THE INVENTION

One embodiment of the present invention sets forth a method for executing a non-local return instruction in a parallel thread processor. The method comprises the steps of receiving, within the thread group, a first long jump instruction, in response to the first long jump instruction, popping a first token from an execution stack, determining whether the first token is a first long jump token that was pushed onto the execution stack when a first push instruction associated with the first long jump instruction was executed, wherein the first long jump token specifies an address of a second instruction, and for each active thread in the thread group, when the first token is the first long jump token, jumping to the second instruction based on the address specified by the first long jump token, or, when the first token is not the first long jump token, disabling the active thread until the first long jump token is popped from the execution stack.

One advantage of the disclosed technique is that, via the long jump instructions, i.e., the PLONGJMP and the LONGJMP instructions, non-local returns can be executed by threads within the thread group. The token management system implemented by the long jump instructions ensure that the threads jump to the correct instructions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
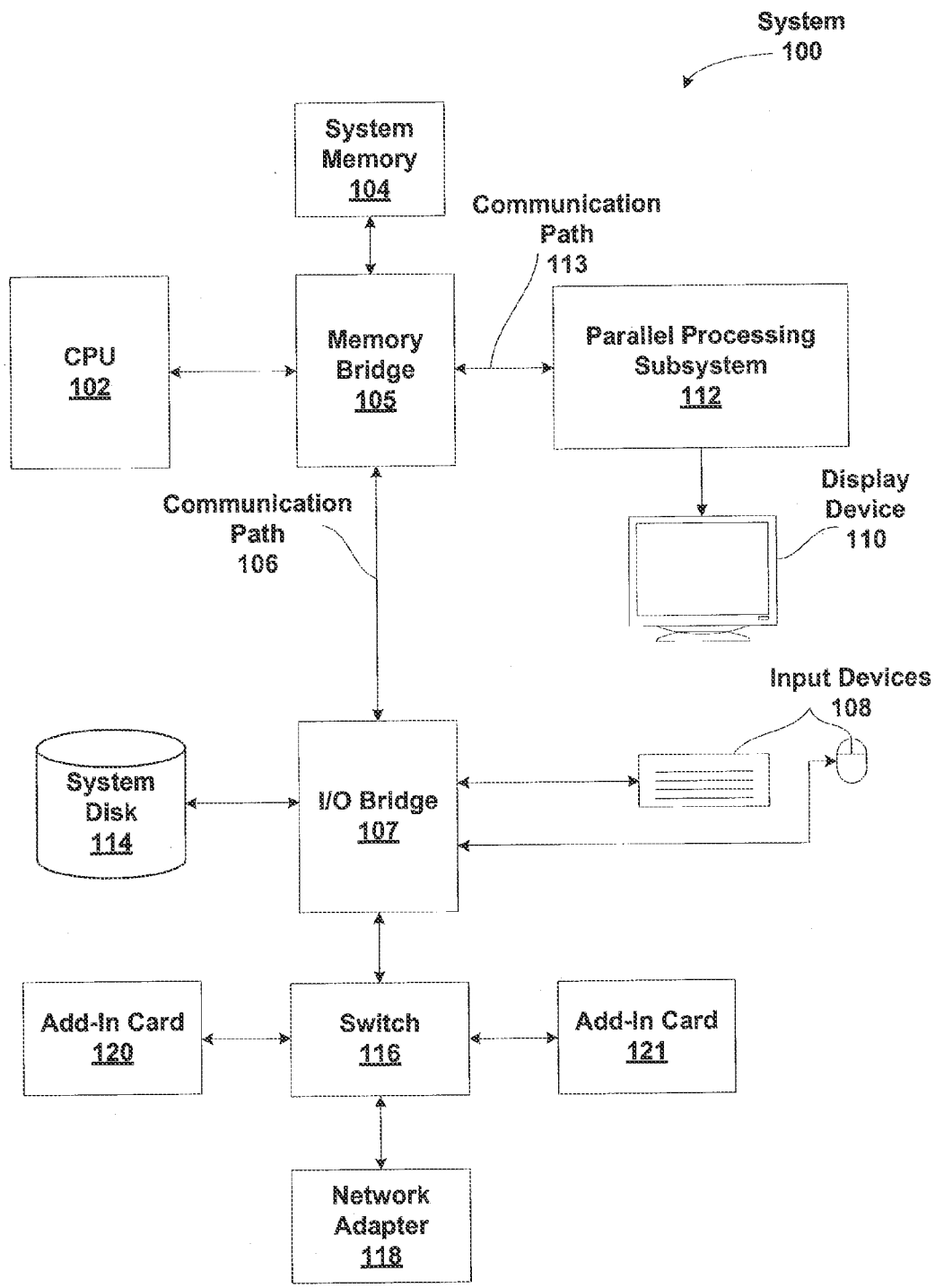
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport™ link) to an input/output (I/O) (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport™ link); in one embodiment parallel processing subsystem 112 is a graphics subsystem that delivers pixels to a display device 110 (e.g., a conventional cathode ray tube (CRT) or liquid crystal display (LCD) based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, compact disc (CD) drives, digital versatile disc (DVD) drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport™, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

Figure 2:
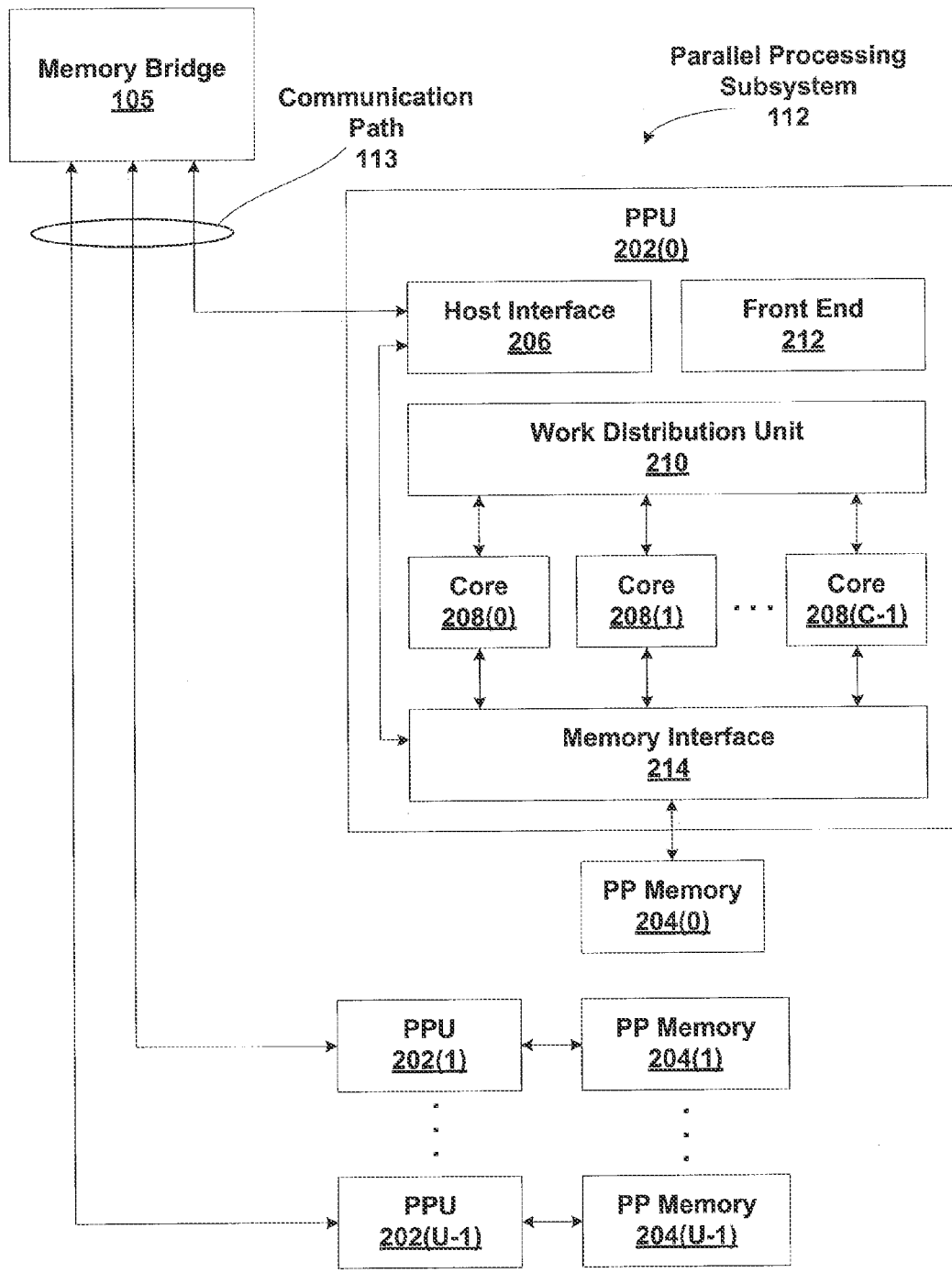
FIG. 2 is a block diagram of a parallel processing subsystem for the computer system of FIG. 1 in accordance with one or more aspects of the present invention.

FIG. 2 illustrates a parallel processing subsystem 112, according to one embodiment of the invention. Parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≥1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
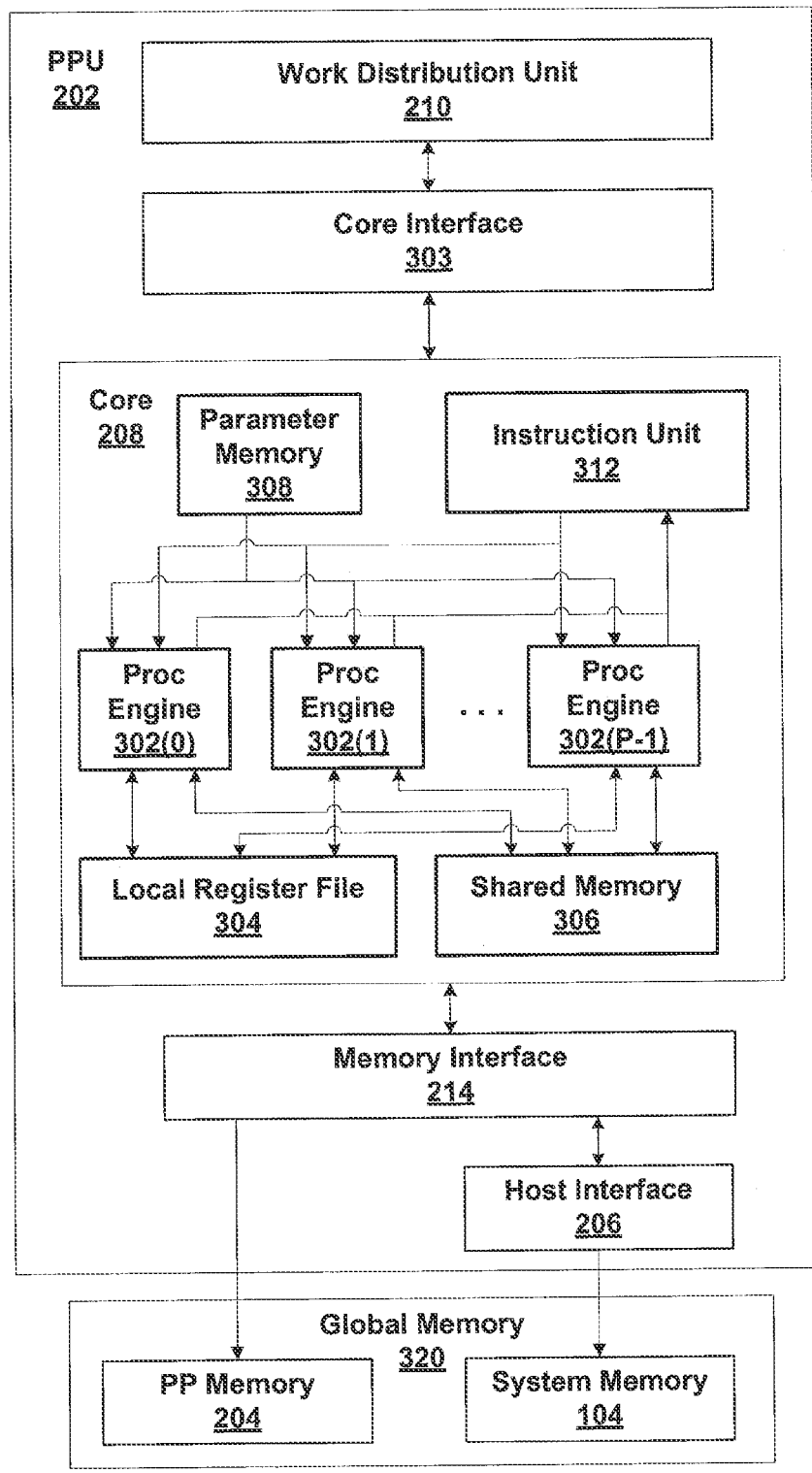
FIG. 3 is a block diagram of a parallel processing unit for the parallel processing subsystem of FIG. 2 in accordance with one or more aspects of the present invention.

FIG. 3 is a block diagram of a parallel processing unit 220 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In some embodiments, single-instruction, multiple-thread (SIMT) techniques are used to support parallel execution of a large number of generally synchronized threads, using a common instruction unit configured to issue instructions to a set of processing engines. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In a way similar to a SIMD machine, a SIMT parallel processing core 208 executes instances of a single parallel program on different data across a plurality of parallel processing engines 302 included in the core 208. Thus, for example, the core 208 may be configured to execute a series of common instructions on the parallel processing engines 302 within the core 208. The collection of a certain number of concurrently executing threads among the parallel processing engines 302 within a core 208 is referred to herein as a "warp" or "thread group." Additionally, a plurality of related thread groups may be active (in different phases of execution) at the same time on a core 208. A collection of related thread groups is referred to herein as a "cooperative thread array" ("CTA").

The size of a particular CTA is equal to m*k, where k is the number of concurrently executing threads in a thread group and is typically an integer multiple of the number of parallel processing engines 302 in a core 208, and m is the number of related thread groups simultaneously active on the core 208. The size of a CTA is generally determined by the programmer and the amount of hardware resources, such as memory or registers, available to the CTA. Depending on resource usage per CTA, core 208 can execute one or several CTAs concurrently.

In one embodiment, each core 208 includes an array of P (e.g., 8, 16, etc.) parallel processing engines 302 configured to receive SIMT instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate synchronous parallel execution. A SIMT instruction may specify a register operand which accesses a register entry in each lane corresponding to each thread of a thread group. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208 and may be used to transfer data between different threads. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache (s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) may be issued to all P processing engines 302. Thus, at the level of a single clock cycle, core 208 implements a microarchitecture substantially representing a P-way SIMT or SIMD design. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in thread groups. As used herein, a "thread group" refers to a group of up to P threads of execution of the same program on different input data, with one thread of the group being assigned to each processing engine 302. A thread group may include fewer than P threads, in which case some of processing engines 302 will be idle during cycles when that thread group is being processed. A thread group may also include more than P threads, in which case processing will take place over consecutive clock cycles. Since each processing engine 302 can support up to G threads concurrently, it follows that up to G thread groups can be executing in core 208 at any given time.

On each clock cycle, one instruction is issued to all P threads making up a selected one of the G thread groups. To indicate which threads are currently active, an "active mask" for the associated threads may be included with the instruction. Processing engine 302 uses the active mask and a thread group identifier to determine which portion of its assigned lane in local register file 304 should be used when executing the instruction. Thus, in a given cycle, all processing engines 302 in core 208 may be synchronously executing the same instruction for different threads in the same thread group. Those skilled in the art will recognize that such synchronous parallel execution of each thread in a thread group is characteristic of a SIMD architecture. When the threads in a thread group are executing synchronously, processing engines 302 are configured to execute instructions in a SIMD manner. However, in some instances, some threads in a thread group may be temporarily idle, e.g., due to conditional or predicated instructions, divergence at branches in the program, or the like, as described further herein. Processing engines 302 may be configured to function as SIMD or SIMT engines.

Operation of core 208 is advantageously controlled via a core interface 303. In some embodiments, core interface 303 receives data to be processed (e.g., primitive data, vertex data, and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or thread group in instruction unit 312, then signals instruction unit 312 to begin executing the threads. When execution of a thread or thread group is completed, core 208 advantageously notifies core interface 303. Core interface 303 can then initiate other processes, e.g., to retrieve output data from shared memory 306 and/or to prepare core 208 for execution of additional threads or thread groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Persons skilled in the art will understand that the architecture described in FIGS. 1, 2 and 3 in no way limits the scope of the present invention and that the techniques taught herein may be implemented on any properly configured processing unit, including, without limitation, one or more CPUs, one or more multi-core CPUs, one or more GPUs, one or more multi-core GPUs, or the like, without departing the scope of the present invention.

Thread Arrays and Cooperative Thread Arrays

In some embodiments, multithreaded processing core 208 of FIG. 3 can execute general-purpose computations using thread blocks or thread arrays. A thread array consists of a number ($n_0$) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are arranged as "cooperative" thread arrays, or CTAs. Each CTA is a group of threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another. In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions of an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set or produces one portion of the output data set. A CTA program can implement algorithms using a wide range of mathematical and logical operations, and the program can include conditional or branching execution paths and direct and/or indirect memory access.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched. More generally, since all threads in a CTA execute the same program in the same core 208, any thread can be assigned any thread ID, as long as each valid thread ID is assigned to only one thread. Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. It should be noted that as long as data sharing is controlled by reference to thread IDs, the particular assignment of threads to processing engines will not affect the result of the CTA execution. Thus, a CTA program can be independent of the particular hardware on which it is to be executed.

Multithreaded Instruction Processing

Figure 4:
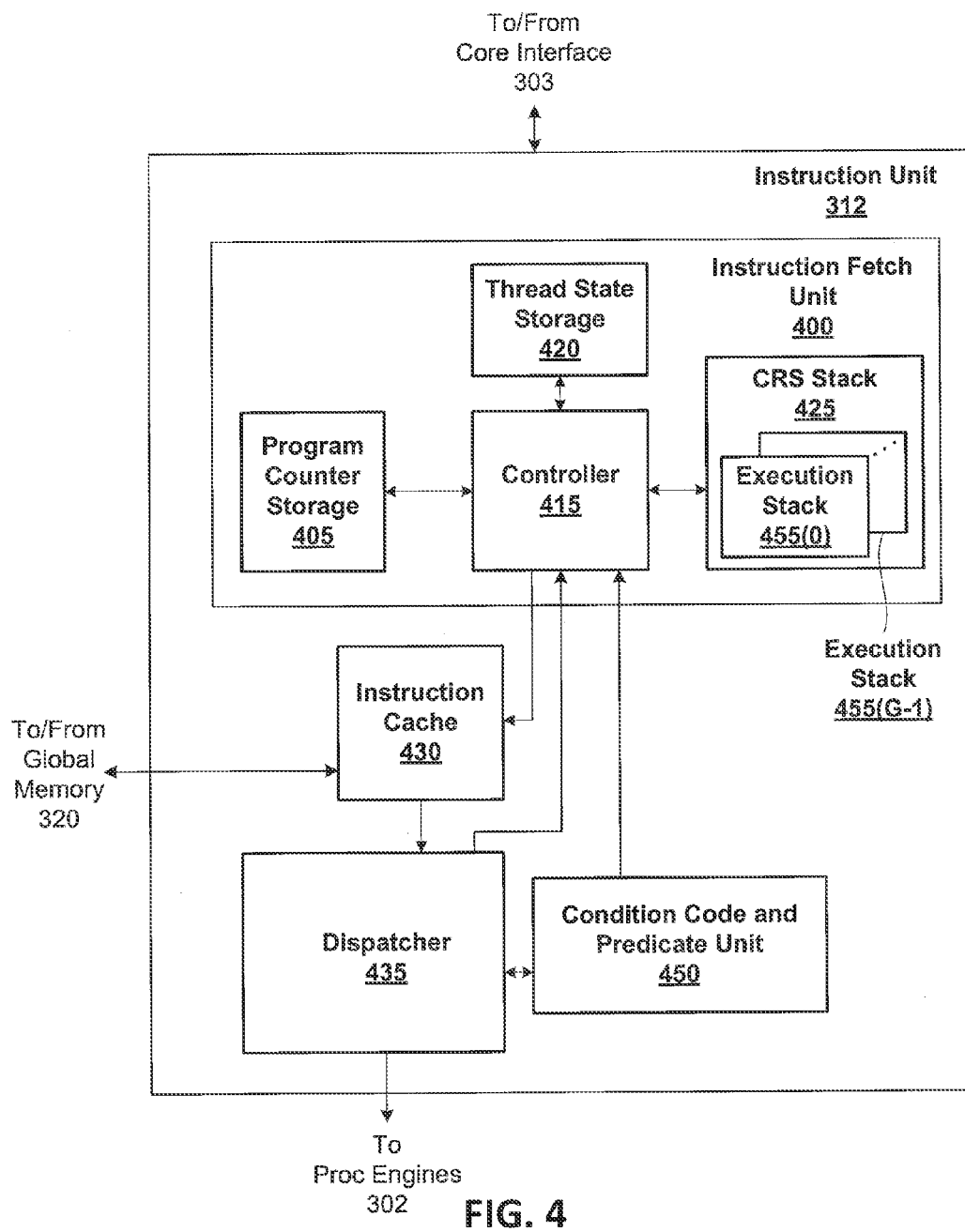
FIG. 4 is a block diagram of an instruction unit for the parallel processing unit of FIG. 3 in accordance with one or more aspects of the present invention.

FIG. 4 is a block diagram of instruction unit 312 for the parallel processing unit 202 of FIG. 3, in accordance with one or more aspects of the present invention. Instruction unit 312 includes an instruction fetch unit 400, instruction cache 430, constant cache, dispatcher 435, and condition code and predicate unit 450. Instruction fetch unit 400 receives data to be processed and a program identifier corresponding to a program that should be used to process the data.

A program counter storage 405 stores the active program counter, indicating the next program instruction (INSTR) that should be executed for each thread group. When G=24, program counter storage 405 stores 24 active program counters. Similarly, thread state storage 420 stores an active mask for each thread group, where each bit of the active mask corresponds to one thread of the thread group. Therefore, the number of bits in the active mask is P, the number of threads in a thread group. Thread state storage 420 also stores a disable mask for each thread group. The disable mask includes a flag for each one of the threads in the thread group. The flag indicates if a thread is enabled, disabled for the processing of a control instruction, or if the thread has exited the program.

CRS (call, return, synchronization) stack 425 includes an execution stack for each thread group, shown as execution stacks (0) through (G−1) in FIG. 4. The execution stacks are used during control instruction processing to push and pop tokens that include state information, e.g., token type, token program counter, and token mask. In some embodiments of the present invention, CRS stack 425 may spill entries to a cache or global memory 320 for any execution stacks 455 that overflow and restore spilled entries when space is available in CRS stack 425. Controller 415 pushes and pops entries from CRS stack 425 as control instructions are executed. In one embodiment, there are six types of control instructions: conditional (predicated) branch instructions, call instructions, PreBreak instructions, PreReturn instructions, conditional return instructions, synchronization instructions, and conditional break instructions. Alternative embodiments may include more or fewer types of control instructions as well as different types of control instructions.

Controller 415 provides an active program counter and active mask for a thread group to instruction cache 430. Instruction cache 430 obtains the instruction corresponding to the active program counter and outputs the instruction and active mask to dispatcher 435. Instruction cache 430 reads the instructions from global memory 320 as needed, using caching techniques known to those skilled in the art. Controller 415 receives control information from condition code and predicate unit 450 via control information when a control instruction is executed. The control information includes a token type indicating the type of control instruction, a stack unwind signal, and other data needed to push tokens onto CRS stack 425 and update the active mask and disable mask for the thread group.

Dispatcher 435 decodes the instruction and outputs conditional data for any predicated or conditional control instructions (conditional branch, conditional break, conditional return, and predicated instructions) to condition code and predicate unit 450. The conditional data includes the predicate test and the condition test and the comparison value (specified by the control instruction) to which the condition code is applied. Conventionally condition codes are used to evaluate the condition test specified by the instruction for a comparison value to produce a true or false result. Six of the eight condition tests for integer values are conventional condition tests, e.g., less than (LT), equal (EQ), greater than (GT), less than or equal (LE), greater than or equal (GE), and not equal (NE). The condition tests are used to determine whether the comparison value is positive, zero, or negative.

When floating point format values are used, the condition tests may also include condition tests that define the behavior for unordered values, such as NaN (not-a-number) values. A NaN does not have an order relative to numeric values, and therefore, can yield unexpected results when used to produce a comparison value or as the input for a conventional condition test. Eight condition tests, e.g., LEG, U, LTU, EQU, LEU, GTU, NEU, and GEU, provide for explicit handling of NaN values. LEG (less than, equal, or greater than) is only true when the comparison value is zero, positive, or negative, i.e., ordered. U (unordered) is only true when the comparison value is unordered, i.e., NaN. LTU (less than zero or unordered) is true when the comparison value is negative or NaN. EQU (equal to zero or unordered) is only true when the comparison value is zero or NaN. LEU (less than or equal to zero or unordered) is only true when the comparison value is negative, zero, or NaN. GTU (greater than zero or unordered) is only true when the comparison value is positive or NaN. NEU (not equal to zero or unordered) is only true when the comparison value is positive, negative, or NaN. GEU (greater than or equal to zero or unordered) is only true when the comparison value is positive, zero, or NaN.

The other two conventional condition tests (for integer and floating point values) are always (TR) and never (FL). Additional condition tests, such as overflow and carry, may also be used and the number of condition tests is increased accordingly. The comparison value may be computed during execution of the program and each thread in the thread group may have a comparison value. Therefore, some threads may produce a true result while others produce a false result, when the condition test is evaluated. Similarly, when a predicate test is evaluated, some threads may evaluate a true result and some may evaluate a false result. In a conditional control or branch instruction, when one or more active threads produce a different predicate or condition test result than other active threads, the threads diverge and CRS stack 435 is used to store a token including an active mask and program counter for the side of the branch that will be executed after a first side of the branch has completed execution.

In addition to the conditional data, dispatcher also outputs the control instruction (call, break, return, conditional branch, predicated branch or the like), any target program counter (address) specified by the instruction, and active mask to condition code and predicate unit 450. Control instructions are not output to processing engines 302 by dispatcher 435. Instead, condition code and predicate unit 450 determines a "taken" mask based on the active mask that is included in the control information output to controller 415 by condition code and predicate unit 450. Specifically, condition code and predicate unit 450 uses the predicate test and condition test result to determine a "taken mask" that indicates the active threads which evaluate to TRUE for the predicate test and condition test specified by the control instruction. Bits of the taken mask for threads in the thread group that indicate a true comparison test result are cleared. The active mask and taken mask may be used by controller 415 to update the disable mask. When a function call is performed with two or more threads having different function pointers, the function call is serialized to execute the threads specifying each unique function pointer and the taken mask is used to indicate the active threads for each unique function pointer.

Condition code and predicate unit 450 outputs the taken mask and token type to controller 415 via control information. When a target program counter is specified by a call or branch control instruction, the taken program counter is output by condition code and predicate unit 450 to controller 415 via control information. The token type indicates the type of control instruction that was executed to produce the disable mask. Token types include: sync, call, diverge, and break. Note, that when a control instruction for a thread is in-flight, i.e., output by controller 415 and not yet received by controller 415 via control information, another instruction for the same thread should not be output by controller 415.

Other instructions (non-control instructions), received by dispatcher 435 are queued for output to processing engines 302. Dispatcher 435 may be configured to output instructions based on the availability of (computational or storage) resources that are needed to process the instruction. In some embodiments of dispatcher 435, a scoreboarding scheme is used to track resource availability and determine which instructions can be output to processing engines 302. When processing engines 302 receive an instruction, a read request is generated to obtain any operands that are needed to execute the instruction and the read request is output to LRF 304 or shared memory 306. The instruction is then processed by processing engines 302 when the operands have been obtained.

Support for Non-Local Returns in a SIMT Environment

In a SIMT environment, when a thread group executes a code sequence, a situation may occur where one or more threads execute non-local returns. An example of such a scenario would be during exception handling. A setjmp and longjmp instruction pair can be used within a code sequence to implement such a non-local return. When a longjmp instruction is executed, the nearest setjmp instruction within the code sequence may not be the corresponding setjmp instruction. To ensure that the threads within the thread group that execute a longjmp instruction jump to the correct location, a token mechanism is implemented.

More specifically, a compiler, when compiling a code sequence, inserts a PLONGJMP instruction into the code sequence when a setjmp instruction is encountered. The PLONGJMP instruction, when executed, causes a PLONGJMP token to be pushed onto the CRS stack 425. The compiler also inserts a LONGJUMP instruction into the code sequence when a longjmp instruction is encountered. The LONGJMP instruction, when executed, causes the CRS stack 425 to be unwound until the associated PLONGJMP token is found. Once the associated PLONGJMP token is found, the active threads jump to the instruction specified by the PLONGJMP token. The execution of the PLONGJMP instruction and the LONGJMP instruction are described in detail below in conjunction with FIGS. 5A and 5B.

Figure 5A:
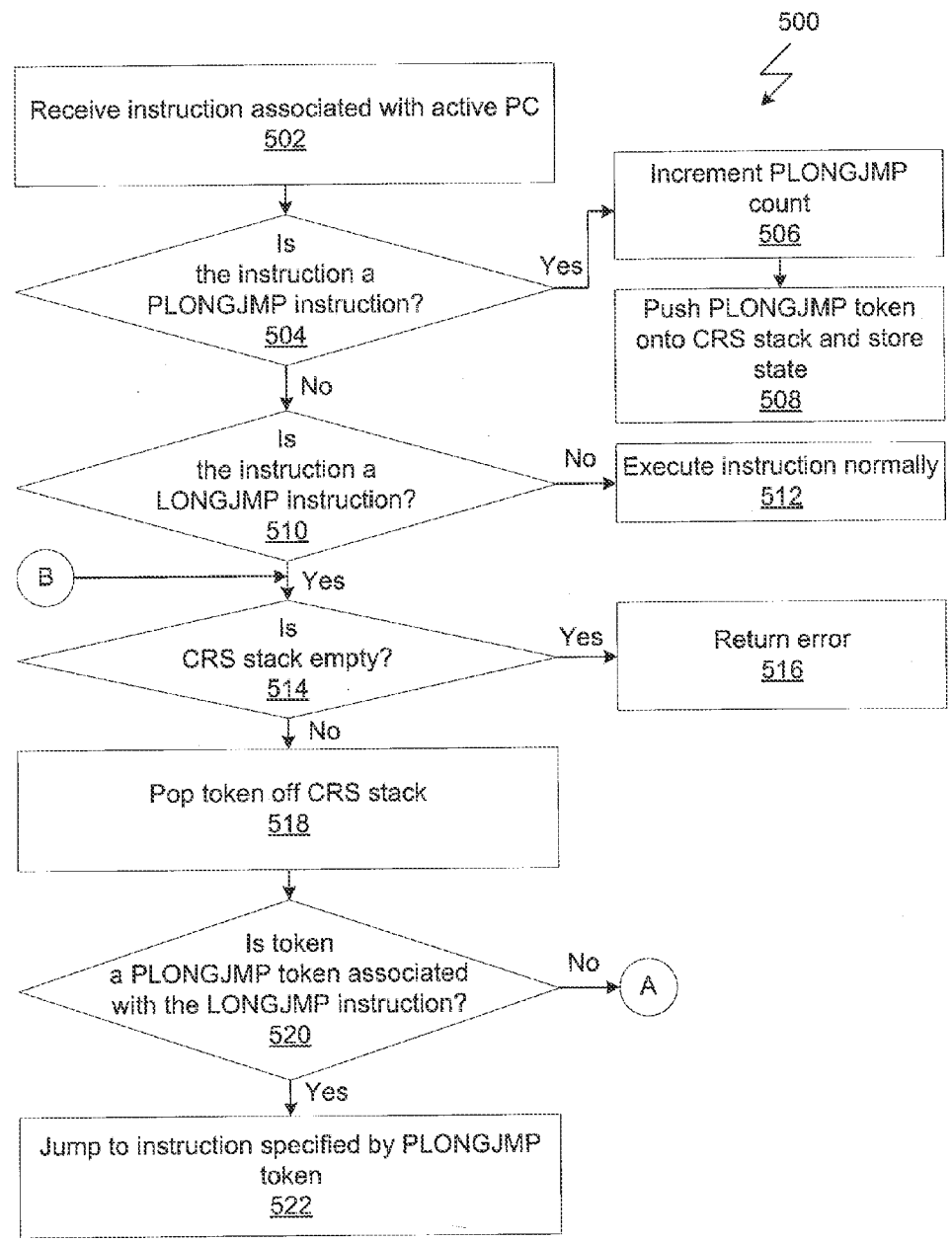
FIGS. 5A and 5B set forth a flow diagram of method steps for processing a long jump instruction in accordance with one or more aspects of the present invention.
Figure 5B:
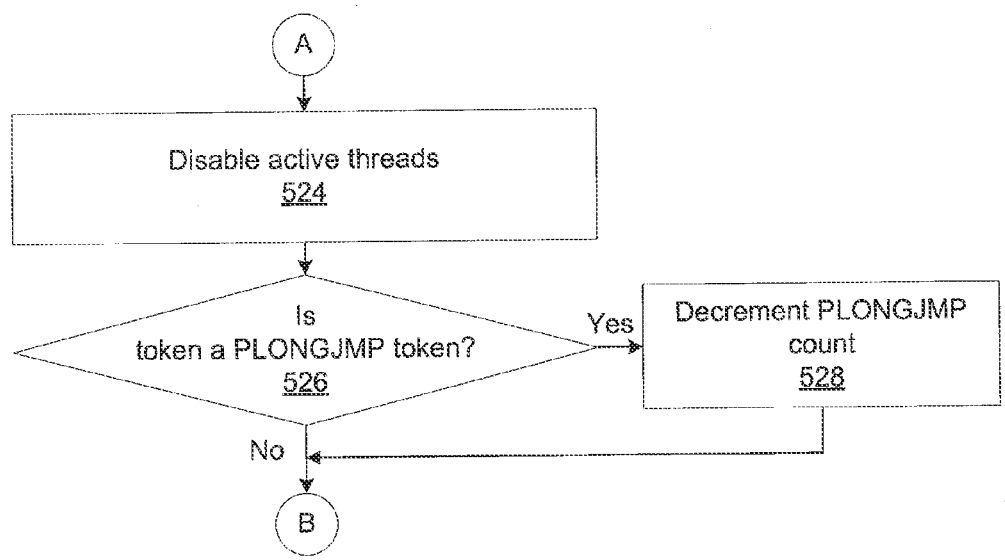

FIGS. 5A and 5B set forth a flow diagram of method steps for processing a long jump instruction in accordance with one or more aspects of the present invention. Although the method steps are described in conjunction with the systems for FIGS. 1-4, persons skilled in the art will understand that any system configured to perform the method steps, in any order, is within the scope of the invention.

The method 500 begins at step 502, where the thread group executing within a core 208 receives an instruction associated with the active program counter (PC). At step 504, if the instruction is a PLONGJMP instruction, then the method proceeds to step 506. At step 506, the PLONGJMP counter is incremented indicating that a PLONGJMP instruction has been executed. At step 508, a PLONGJMP token is pushed onto the CRS stack 425 and the current value of the PLONGJMP counter as well as other state information is stored in pre-determined registers. The PLONGJMP token includes an active mask of currently active threads of the thread group as well as the program counter target instruction associated with the jump.

At step 504, if the instruction is not a PLONGJMP instruction, then the method proceeds to step 510. At step 510, if the instruction is not a LONGJMP instruction then the method proceeds to step 512, where the instruction is executed normally. The instruction may be another control instruction or a simple register manipulation instruction. The execution of these instructions is outside the scope of this invention and may be performed in any technically feasible manner.

At step 510, if the instruction is a LONGJMP instruction then the method proceeds to step 514, where the CRS stack 425 is accessed to determine whether the CRS stack 425 is empty. If the CRS stack 425 is empty, then the method 500 proceeds to step 516, where an error is transmitted. An error is transmitted because a LONGJMP instruction cannot be processed without a corresponding PLONGJMP instruction that pushes a PLONGJMP token onto the CRS stack 425. Since the CRS stack 425 is empty, a PLONGJMP token pushed by the corresponding PLONGJMP instruction was not found in the CRS stack 425.

If, at step 514, the CRS stack 425 is not empty, then the method 500 proceeds to step 518, where a token is popped off the CRS stack 425. At step 520, the thread group determines whether the token popped off the CRS stack 425 at step 518 is a PLONGJMP token associated with the LONGJMP instruction. This determination is performed by matching the current value of the PLONGJMP counter with the value of the PLONGJMP counter that was stored when the PLONGJMP instruction corresponding the LONGJMP instruction was executed. When both values match, then the token popped off the CRS stack 425 is the PLONGJMP token associated with the LONGJMP instruction. When the values do not match, then the token popped off the CRS stack 425 is not the PLONGJMP token associated with the LONGJMP instruction.

If, at step 520, the token popped off the CRS stack 425 at step 518 is the PLONGJMP token associated with the LONGJMP instruction, then the method 500 proceeds to step 522. At step 522, each of the active threads jumps to the instruction specified by PLONGJMP token associated with the LONGJMP instruction. The PLONGJMP counter is decremented indicating that a PLONGJMP token has been popped off the CRS stack 425. If, however, at step at step 520, the token popped off the CRS stack 425 at step 518 is not the PLONGJMP token associated with the LONGJMP instruction, then the method 500 proceeds to step 524.

At step 524, the active threads in the thread group are disabled because the PLONGJMP token associated with the LONGJMP instruction has not been popped from the stack. In one embodiment, the disable mask can be logically viewed as a collection of 1-bit masks, where each bit in the mask corresponds to a different thread and indicates whether that thread is enabled or disabled. At step 526, if the token popped off the CRS stack 425 at step 520 is a PLONGJMP token, then the method proceeds to step 528.

At 528, the PLONGJMP counter is decremented indicating that a PLONGJMP token has been popped off the CRS stack 425. The method then returns to step 514, previously described herein. In addition, if, at step 526, the token popped off the CRS stack 425 at step 520 is not a PLONGJMP token, then the method also returns to step 514. In such a manner, when a LONGJMP instruction is executed, the method 500 continues to unwind the CRS stack 425 until the PLONGJMP token pushed onto the CRS stack 425 when the corresponding PLONGJMP instruction was executed is found. This ensures that the threads jump to the correct instruction when a long jump is executed.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, read-only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for executing a non-local return instruction in a parallel thread processor, the method comprising:
   receiving, within a thread group including a plurality of active threads, a first long jump instruction;
   in response to the first long jump instruction, popping a first token from an execution stack;
   determining whether the first token is a first long jump token that was pushed onto the execution stack when a first push instruction associated with the first long jump instruction was executed, wherein the first long jump token specifies an address of a second instruction; and
   for each active thread in the thread group, when the first token is the first long jump token, jumping to the second instruction based on the address specified by the first long jump token, or, when the first token is not the first long jump token, disabling the active thread until the first long jump token is popped from the execution stack.

2. The method of claim 1, further comprising the step of, in response to the first push instruction, incrementing a long jump counter associated with the thread group.

3. The method of claim 2, further comprising the step of, in response to the first push instruction, storing a first value of the long jump counter that corresponds to the incremented long jump counter.

4. The method of claim 3, wherein the step of determining whether the first token is the first long jump token comprises comparing the first value of the long jump counter with a current value of the long jump counter.

5. The method of claim 4, wherein the first token is the first long jump token when the first value of the long jump counter corresponds to the current value of the long jump counter.

6. The method of claim 4, wherein the first token is not the first long jump token when the first value of the long jump counter does not correspond to the current value of the long jump counter.

7. The method of claim 6, further comprising the step of decrementing the long jump counter associated with the thread group when the first token is not the first long jump token.

8. The method of claim 7, further comprising the step of, after decrementing the long jump counter, popping a second token from the execution stack.

9. The method of claim 8, further comprising the step of determining whether the second token is the first long jump token.

10. The method of claim 1, wherein the first push instruction and the first long jump instruction are inserted into a shader program by a compiler, wherein the shader program is executed by the thread group.

11. A non-transitory computer-readable storage medium storing instructions that, when executed by a processor, cause the processor to execute a non-local return instruction in a parallel thread processor, by performing the steps of:
receiving, within a thread group including a plurality of active threads, a first long jump instruction;
in response to the first long jump instruction, popping a first token from an execution stack;
determining whether the first token is a first long jump token that was pushed onto the execution stack when a first push instruction associated with the first long jump instruction was executed, wherein the first long jump token specifies an address of a second instruction; and
for each active thread in the thread group, when the first token is the first long jump token, jumping to the second instruction based on the address specified by the first long jump token, or, when the first token is not the first long jump token, disabling the active thread until the first long jump token is popped from the execution stack.

12. The non-transitory computer-readable storage medium of claim 11, further comprising the step of, in response to the first push instruction, incrementing a long jump counter associated with the thread group.

13. The non-transitory computer-readable storage medium of claim 12, further comprising the step of, in response to the first push instruction, storing a first value of the long jump counter that corresponds to the incremented long jump counter.

14. The non-transitory computer-readable storage medium of claim 13, wherein the step of determining whether the first token is the first long jump token comprises comparing the first value of the long jump counter with a current value of the long jump counter.

15. The non-transitory computer-readable storage medium of claim 14, wherein the first token is the first long jump token when the first value of the long jump counter corresponds to the current value of the long jump counter.

16. The non-transitory computer-readable storage medium of claim 14, wherein the first token is not the first long jump token when the first value of the long jump counter does not correspond to the current value of the long jump counter.

17. The non-transitory computer-readable storage medium of claim 16, further comprising the step of decrementing the long jump counter associated with the thread group when the first token is not the first long jump token.

18. The non-transitory computer-readable storage medium of claim 17, further comprising the step of, after decrementing the long jump counter, popping a second token from the execution stack.

19. The non-transitory computer-readable storage medium of claim 11, wherein the first push instruction and the first long jump instruction are inserted into a shader program by a compiler, wherein the shader program is executed by the thread group.

20. A computing device, comprising:
a memory; and
a processor configured to:
receive, within a thread group including a plurality of active threads, a first long jump instruction;
in response to the first long jump instruction, pop a first token from an execution stack;
determine whether the first token is a first long jump token that was pushed onto the execution stack when a first push instruction associated with the first long jump instruction was executed, wherein the first long jump token specifies an address of a second instruction; and
for each active thread in the thread group, when the first token is the first long jump token, jump to the second instruction based on the address specified by the first long jump token, or, when the first token is not the first long jump token, disable the active thread until the first long jump token is popped from the execution stack.

* * * * *